July 17, 1923.
W. H. MONRQE
LAND LEVELER
Filed Aug. 1, 1922
1,462,120
2 Sheets-Sheet 1
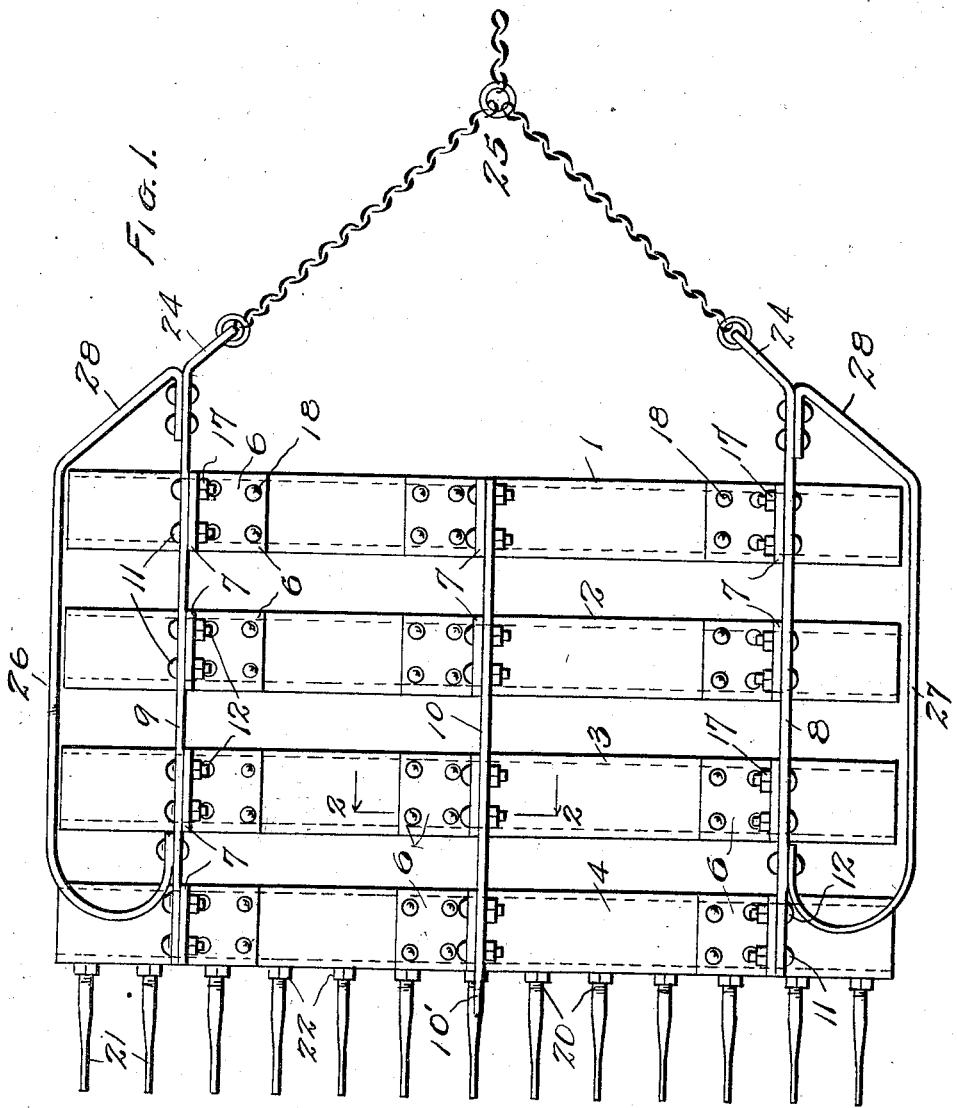
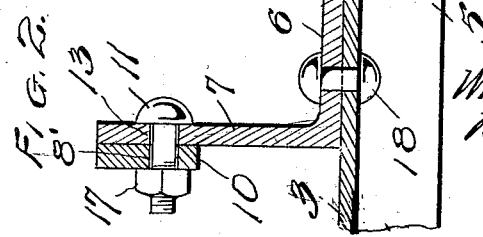
Inventor
WILLIAM H. MONROE
By Thomas R. Harries
Attorney

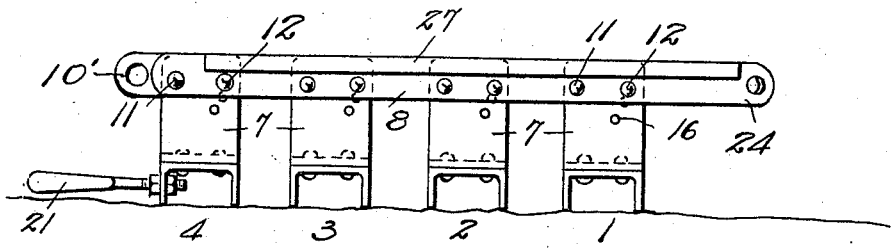
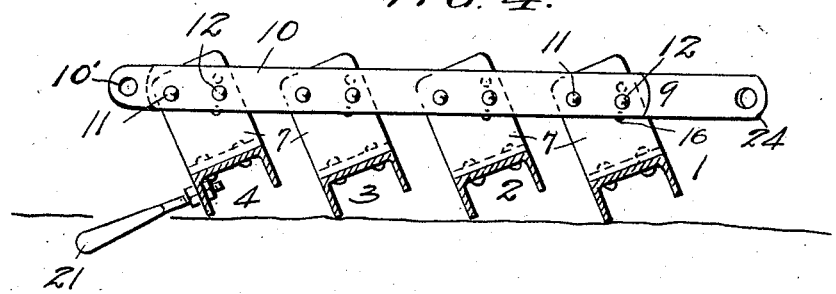
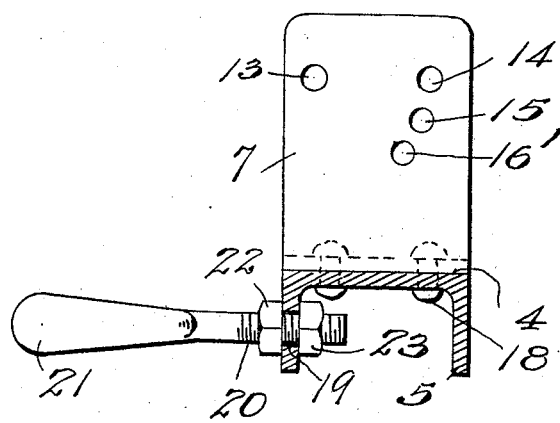

Patented July 17, 1923.

1,462,120

UNITED STATES PATENT OFFICE.

WILLIAM H. MONROE, OF SAN JOSE, CALIFORNIA.

LAND LEVELER.

Application filed August 1, 1922. Serial No. 578,945.

*To all whom it may concern:*

Be it known that I, WILLIAM H. MONROE, a citizen of the United States of America, residing at San Jose, in the county of Santa Clara and State of California, have invented certain new and useful Improvements in Land Levelers, of which the following is a specification.

The present invention relates to an improved land leveler or drag for use in cultivating the soil, grading, and smoothing the land surface. The primary object of the invention is the provision of a strong and well braced implement of this character, which is durable, comparatively simple in construction and operation, of sufficient weight for dragging over the ground surface with a leveling action and scraping of the surface, and which is capable of adjustment for adapting the scrapers to various kinds of soil and different conditions to be overcome, in leveling operations.

The invention in its physical embodiment is found to be comparatively inexpensive in cost of material and manufacture and has been for some time in actual and successful operation. Certain novel combinations and arrangements of parts constitute the invention and they will be pointed out in the appended claims.

In the accompanying drawings I have illustrated one complete example of the physical embodiment of my invention, wherein the parts are combined and arranged according to the best mode I have thus far devised for the successful reduction to practice of the invention, but it will be understood that changes and alterations are contemplated and may be made in the illustrated form of the invention, without departing from the spirit of my invention.

Figure 1 is a plan view of the implement embodying my invention, the several scraping elements being shown in horizontal position and with the scraping or cutting teeth also projected rearwardly in horizontal position.

Figure 2 is an enlarged, detail vertical sectional view at line 2—2 of Figure 1 showing the relation of one of the angle brackets to the scraper bars and longitudinal supporting bars.

Figure 3 is a side view of the implement in Figure 1.

Figure 4 is a longitudinal, vertical sectional view through the implement showing the scraper bars in adjusted tilted position.

Figure 5 is an enlarged detail sectional view transversely of one of the scraper bars and showing also the bolt holes in the angle brackets.

The implement now in actual use approximates the structure shown in the drawings, and in carrying out my invention and constructing the leveler I employ a series of transversely arranged scrapers indicated by the numerals 1, 2, 3, 4. A larger number or a smaller number of these scrapers may be used if desired, and while I have shown the scrapers as channel beams with depending flanges 5, it will be understood that other shapes, such as T-beams or angle beams may be used. The depending flanges 5 are designed and located in proper position to travel over the surface of the ground or soil as scrapers or drags for grading, smoothing, and leveling the surface, and the weight of these transverse beams is sufficient to hold the implement to the ground to cut to the required depth.

These transverse scrapers are arranged in parallelism and properly spaced apart, and on their upper plates are attached angle brackets all of which are similar in size and shape and comprising horizontal flanges 6 and vertical flanges 7. The angle brackets, as shown in Figure 1 are attached near each end, and one at the middle of each of the scrapers, and arranged in three rows on the upper surface of the implement, with their vertical flanges or webs 7 in alinement. And by means of these brackets the scrapers are connected with a pair of lateral bars 8 and 9, and an intermediate bar 10. These three bars are fashioned of flat metal plates of the required dimensions, which extend longitudinally of the implement, and each bracket is connected with each longitudinal bar by means of a pair of bolts 11 and 12. The bolts are passed through bolt holes 8' arranged in pairs in the three longitudinal bars, and the flanges 7 of the angle brackets are provided with complementary bolt holes 13, 14, 15, 16, for the bolts. The bolts 11 in each case are adapted to act as pivot bolts and the bolts 12 are adapted to act as clamp bolts for the pivot bolts in adjusting or tilting the scrapers from their horizontal positions. Thus in Figure 4 it will be seen that the scrapers are each capable of independent adjustment by removing the bolts 12 and loosening the nuts 17 of the bolts 11, then swinging the scraper bar and its brackets to desired position, after which adjustment, the nuts 17 may be applied to the bolts 11 and 12 and tightened to hold the brackets in rigid relation to the several bars 8, 9, 10. I have found that this means of adjusting the implement is simple and expeditious, but it will be understood that other adjusting means, as for instance levers and connecting links may be used in connection with the scrapers to simultaneously move them to adjusted position. In such event the arcuate series of bolt holes 14, 15, 16, in the brackets, will be dispensed with and each flange 7 of the brackets will be fashioned with an arcuate slot in place of the series of holes.

The angle brackets are rigidly and securely attached to the upper plates of the channel beams or scrapers by means of rivets 18, applied in suitable number and joining together the top plates of the several scrapers with the horizontal flanges 6 of the brackets.

At the rear of the implement means are provided for cutting into the surface of the soil or ground, and for this purpose the rear flange of the rear scraper 4 is provided with a series of spaced openings 19 extending throughout the length of the flange, the desired distance apart. These openings are designed to receive the threaded bolt heads 20 of the teeth 21 of case hardened steel, which project horizontally and rearwardly of the scraper 4 with their flat faces in vertical planes and their cutting edges adapted to enter the soil below the surface when the scraper 4 is tilted to adjusted position, as in Figure 4.

The threaded shanks or bolts 20 of the teeth are passed through the holes 19 and clamped therein by means of the clamping bolts 22 and 23 bearing against the inner and outer faces of the depending flange of the scraper, which thus hold the teeth in rigid and fixed relationship to the scraper.

The two side bars 8 and 9, as seen in Figure 1 are utilized as draft bars, and at their front perforated ends 24, 24, are bent inwardly and joined by the draft chain 25 to which suitable power, as mechanical or horse power may be applied for dragging the implement.

At 10' the rear end of the center bar 10 is extended and perforated to form means for attachment of a second implement if desired to be used as an additional section or unit of this implement.

To protect trees of an orchard when the implement is used therein, and for other protective purposes, I utilize a pair of lateral shields or side guard-bars 26 and 27 which project beyond the extremities of the scrapers to prevent contact of these extremities with objects. The guard bars extend longitudinally of the implement and are fixed, as by rivets to the main bars 8 and 9, at their respective outer faces. At the front of the implement these guard bars are bent inwardly as at 28 to form obliquely disposed guards to turn down weeds and push the weeds or other growth to the respective sides of the implement to prevent catching on the implement.

From the above description taken in connection with my drawings it will be evident that the implement as illustrated and now used is capable of fulfilling the requirements of a most efficient device, and that it is comparatively simple in construction, may be manufactured at a minimum of cost, and may with facility be adjusted and adapted for various uses on the farm and under other conditions required of such an implement.

Having thus fully described my invention, what I claim as new and desire to secure by Letters Patent is:—

1. The combination with a series of transversely arranged channel-beam scrapers having a plurality of angle brackets attached thereto and arranged in rows, said angle brackets each having a single bolt hole and a spaced series of bolt holes arranged in the arc of a circle with the single bolt hole as a center, of longitudinally disposed draft bars disposed above said scrapers, a bolt connecting each bracket with a bar and adapted to form a pivot, and a second bolt for each bracket passed through a selected hole of a series and adapted to form a clamp bolt.

2. The combination with a series of transversely arranged channel-beam scrapers including a scraper having rearwardly extending teeth, of a plurality of brackets on each scraper arranged in rows, longitudinally disposed draft bars and an intermediate bar above said scrapers, a bolt connecting each bracket with a bar and adapted to form a pivot and a second bolt for each bracket adapted to form a clamp bolt.

3. The combination in an implement as described with a series of transversely arranged channel beam scrapers including a scraper having rearwardly extending teeth, of a plurality of angle brackets attached to said scrapers and arranged in rows, the vertical flange of each bracket having a bolt hole and a spaced arcuate series of bolt holes, an intermediate bar and lateral draft bars longitudinally disposed above the scrapers, laterally projecting guard bars attached to said draft bars, and a pair of bolts connecting each vertical flange with its respective longitudinal bar.

In testimony whereof I have affixed my signature.

WILLIAM H. MONROE.